United States Patent
Jones et al.

(10) Patent No.: US 8,305,264 B1
(45) Date of Patent: Nov. 6, 2012

(54) GPS ENHANCEMENT FOR WIRELESS DEVICES

(75) Inventors: Bryce A. Jones, Overland Park, KS (US); Michael P. McMullen, Leawood, KS (US); Rodney D. Nelson, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 336 days.

(21) Appl. No.: 12/699,245

(22) Filed: Feb. 3, 2010

(51) Int. Cl.
*G01S 19/39* (2010.01)
*G01S 19/17* (2010.01)

(52) U.S. Cl. .............................. 342/357.22; 342/357.55

(58) Field of Classification Search ............. 342/357.74, 342/357.55, 357.32, 357.22
See application file for complete search history.

(56) References Cited

U.S. PATENT DOCUMENTS

| | | | |
|---|---|---|---|
| 5,189,395 A | 2/1993 | Mitchell | |
| 5,276,440 A | 1/1994 | Jolissaint et al. | |
| 5,457,680 A | 10/1995 | Kamm et al. | |
| 5,649,301 A | 7/1997 | Yabusaki et al. | |
| 5,673,305 A | 9/1997 | Ross | |
| 5,731,757 A | 3/1998 | Layson, Jr. | |
| 5,732,347 A | 3/1998 | Bartle et al. | |
| 5,736,962 A | 4/1998 | Tendler | |
| 5,845,142 A | 12/1998 | Hayasaka | |
| 5,919,239 A | 7/1999 | Fraker et al. | |
| 6,014,080 A | 1/2000 | Layson, Jr. | |
| 6,219,540 B1 | 4/2001 | Besharat et al. | |
| 6,330,438 B1 | 12/2001 | McClelland et al. | |
| 6,349,206 B1 | 2/2002 | Reichelt et al. | |
| 6,448,927 B1 * | 9/2002 | Ishigaki et al. | 342/357.31 |
| 6,484,027 B1 | 11/2002 | Mauney et al. | |
| 6,545,448 B1 | 4/2003 | Stanley et al. | |
| 6,606,556 B2 | 8/2003 | Curatolo et al. | |
| 6,639,516 B1 | 10/2003 | Copley | |
| 6,674,368 B2 | 1/2004 | Hawkins et al. | |
| 6,718,263 B1 | 4/2004 | Glass et al. | |
| 6,735,455 B2 | 5/2004 | Naito et al. | |
| 6,856,804 B1 | 2/2005 | Ciotta | |
| 6,884,816 B2 | 4/2005 | May et al. | |
| 6,898,438 B1 | 5/2005 | Uchida | |
| 6,906,522 B2 | 6/2005 | Bertness et al. | |
| 6,985,753 B2 | 1/2006 | Rodriguez et al. | |
| 7,020,460 B1 | 3/2006 | Sherman et al. | |
| 7,024,321 B1 | 4/2006 | Deninger et al. | |
| 7,046,992 B2 | 5/2006 | Wallentin et al. | |
| 7,098,855 B2 | 8/2006 | Kotzin et al. | |
| 7,155,238 B2 | 12/2006 | Katz | |
| 7,164,930 B2 | 1/2007 | Korneluk et al. | |
| 7,409,219 B2 | 8/2008 | Levitan | |
| 2001/0026240 A1 | 10/2001 | Neher | |

(Continued)

OTHER PUBLICATIONS

Mark Amundson, Honeywell International, Inc., "Dead Reckoning for Consumer Electronics," 2006.

(Continued)

*Primary Examiner* — Jack W Keith
*Assistant Examiner* — Fred H Mull

(57) ABSTRACT

Methods and systems are disclosed to help improve accuracy of location determination for a wireless communication device. An exemplary method involves: (a) at a wireless communication device operating in a radio access network, making a determination that the wireless communication device is likely to lose global positioning system (GPS) connectivity; (b) in response to the determination, powering on a GPS receiver to receive GPS location data for the wireless communication device; and (c) powering off the GPS receiver and storing the received GPS location data.

19 Claims, 6 Drawing Sheets

U.S. PATENT DOCUMENTS

| | | |
|---|---|---|
| 2002/0105460 A1* | 8/2002 | Sladen ............. 342/357.14 |
| 2002/0196147 A1 | 12/2002 | Lau |
| 2003/0107514 A1* | 6/2003 | Syrjarinne et al. ....... 342/357.06 |
| 2003/0134648 A1 | 7/2003 | Reed et al. |
| 2003/0162548 A1 | 8/2003 | Kujala |
| 2004/0012519 A1 | 1/2004 | Durst et al. |
| 2004/0021601 A1* | 2/2004 | Farmer ............. 342/357.06 |
| 2004/0176040 A1 | 9/2004 | Thornton et al. |
| 2004/0196182 A1 | 10/2004 | Unnold |
| 2004/0220726 A1 | 11/2004 | Jin et al. |
| 2005/0009521 A1 | 1/2005 | Preece |
| 2005/0024269 A1 | 2/2005 | Kotzin et al. |
| 2005/0096102 A1 | 5/2005 | Mock et al. |
| 2005/0105496 A1 | 5/2005 | Ambrosino |
| 2005/0213716 A1 | 9/2005 | Zhu et al. |
| 2007/0147348 A1 | 6/2007 | Lu |
| 2008/0001771 A1 | 1/2008 | Faoro et al. |
| 2008/0108330 A1 | 5/2008 | O'Neil et al. |

OTHER PUBLICATIONS

Mark Amundson, Honeywell International, Inc., "Compass Assisted GPS for LBS Application," 2006.

ublox, "Antaris Supersense Field Tests—Application Note," 2004.

Wikepedia, "Dead Reckoning." http://en.wikipedia.org/wiki/Dead_reckonging, printed from the World Wide Web on May 1, 2007.

Unpublished U.S. Appl. No. 10/935,884, filed Sep. 8, 2004 entitled "Location-Reporting System and Method Responsive to Connectivity Loss".

Unpublished U.S. Appl. No. 11/937,292, filed Nov. 8, 2007 entitled "Method for Communicating Indoor Location to an Emergency Service System".

* cited by examiner

GPS ENHANCEMENT FOR WIRELESS DEVICES

BACKGROUND

Wireless communication devices such as cell phones and personal digital assistants (PDAs) have become increasingly common in recent years. One of the numerous features that these devices often incorporate is location determination. As a result, a wireless communication device carried by a person may function as a means of locating the person.

In particular, when a user in a wireless communications network initiates a communication session, the nature of the communication may necessitate locating the user. Commonly, a user must be located when the user places a "9-1-1" emergency telephone call. Other scenarios exist as well. For example, a user may contact a service provider requesting directions to nearby restaurants or to a gas station. To provide accurate information, the service provider must be able to determine the user's location.

The advent of cellular telephones required new locating technology. Previously, 911 calls originated mainly from landline telephones. Therefore, the process of determining the location of a caller was usually a simple matter of looking up the street address of the calling telephone number. Unlike landline telephones that were fixedly associated with particular street addresses, cellular telephones could place calls from anywhere within a cellular coverage area. Thus, a more complex system of position determination was required in order to determine the location of a calling cellular telephone.

To facilitate 911 services for cellular telephone callers, the United States Federal Communication Commission (FCC) mandated the implementation of "Enhanced 911" ("E911") services. The E911 mandate was divided into two phases. According to Phase 1, the location had to be identified with an accuracy of at least cell and sector. As this information is typically maintained by a cellular wireless carrier in a subscriber's home location register ("HLR"), Phase 1 presented little technical challenge. According to Phase 2, the location must be provided with far more granularity than the cell and sector information maintained in the HLR. In response, the Telecommunications Industry Association (TIA) has proposed a standard entitled "Enhanced Wireless 9-1-1 Phase 2" or "J-STD-036-A" (including a recent addendum, J-STD-036-A-2002), the entirety of which is hereby incorporated by reference.

Accordingly, wireless communication devices (WCDs) are typically configured for Global Positioning System (GPS) connectivity in order to facilitate location determination. Ideally, a GPS signal would always be available to a WCD. In practice, however, non-GPS zones, which are locations where a GPS signal is not available from a GPS satellite, often exist throughout the coverage area of a radio access network (RAN). Typically, non-GPS zones exist where there is no line-of-sight between the satellite and the WCD. Therefore, indoor locations, such as a subscriber's home or business, typically create non-GPS zones.

In practice, the topology of a given sector often includes both non-GPS zones and zones where GPS is available. Further, multiple non-GPS zones may exist within a given sector of a RAN. For example, in an urban area, a sector that spans a number of city blocks may include both outdoor areas where a GPS signal is available, such as parks, sidewalks, streets, parking lots, etc., as well as indoor or covered areas, such as office buildings and parking garages, which create non-GPS zones in the same sector.

OVERVIEW

Methods and systems are described herein to detect when a wireless communication device (WCD) enters a sector where it will likely lose GPS connectivity (e.g., where a subscriber is likely to enter a non-GPS zone), and responsively obtain GPS location data before the subscriber loses their GPS signal.

The presently disclosed methods and systems may provide a number of benefits. For example, an exemplary method may help a WCD located in a non-GPS zone provide its location more accurately, while also helping the WCD utilize its battery power efficiently. More specifically, by preemptively determining when it is likely to lose its GPS signal, the WCD preferably obtains the last-available GPS coordinates before losing its GPS signal, and therefore may provide a more accurate indication of its location. If the determination were not made preemptively, the WCD would need to leave its GPS receiver on at all times, to provide the last-available GPS coordinates while in a non-GPS zone. However, an exemplary method allows the WCD to power off its GPS receiver when it is not in a GPS-priority sector (i.e.; a sector in which a subscriber is likely to lose GPS connectivity), and only power on the GPS receiver when it is located in a GPS-priority sector and thus likely to need the stored GPS coordinates. Since the GPS receiver drains the battery when on, this method may help reduce the battery power used by the WCD. Other benefits are also possible.

In one aspect, an exemplary method involves: (a) at a wireless communication device operating in a radio access network, making a determination that the wireless communication device is likely to lose global positioning system (GPS) connectivity; (b) in response to the determination, powering on a GPS receiver to receive GPS location data for the wireless communication device; and (c) powering off the GPS receiver and storing the received GPS location data. In addition, the method may involve the WCD generating GPS-availability data identifying GPS-priority sectors for the WCD. The determination that the wireless communication device is likely to lose GPS connectivity may therefore involve determining that the WCD is operating in a GPS-priority sector.

In another aspect, an exemplary method involves: (a) at a radio access network configured to provide wireless service to a wireless communication device in a plurality of sectors, identifying one or more GPS-priority sectors where the wireless communication device is likely to lose GPS connectivity; (b) making a determination that the wireless communication device is located in one of the GPS-priority sectors; and (c) in response to the determination, transmitting a message to the wireless communication device that indicates that the wireless communication device is located in one of the GPS-priority sectors, thereby causing the wireless communication device to power on a GPS receiver to receive GPS location data for the wireless communication device, store the received GPS location data, and then power off the GPS receiver.

In a further aspect, an exemplary system includes: (i) at least one processor; (ii) data storage; and (iii) program logic stored in the data storage and executable by the at least one processor to: (a) determine that a wireless communication device is likely to lose global positioning system (GPS) connectivity; (b) in response to a determination that the wireless communication device is likely to lose GPS connectivity, power on a GPS receiver to receive GPS location data for the wireless communication device; (c) store the received GPS location data in the data storage; and (d) power off the GPS receiver.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a WCD, such as a cellular telephone, pager, or wirelessly-equipped computer, is positioned in a cell, the WCD communicates via an RF air interface with the base station antennae of a cell. Consequently, a communication path can be established between the WCD and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by WCDs in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging WCDs, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Figure 1A:
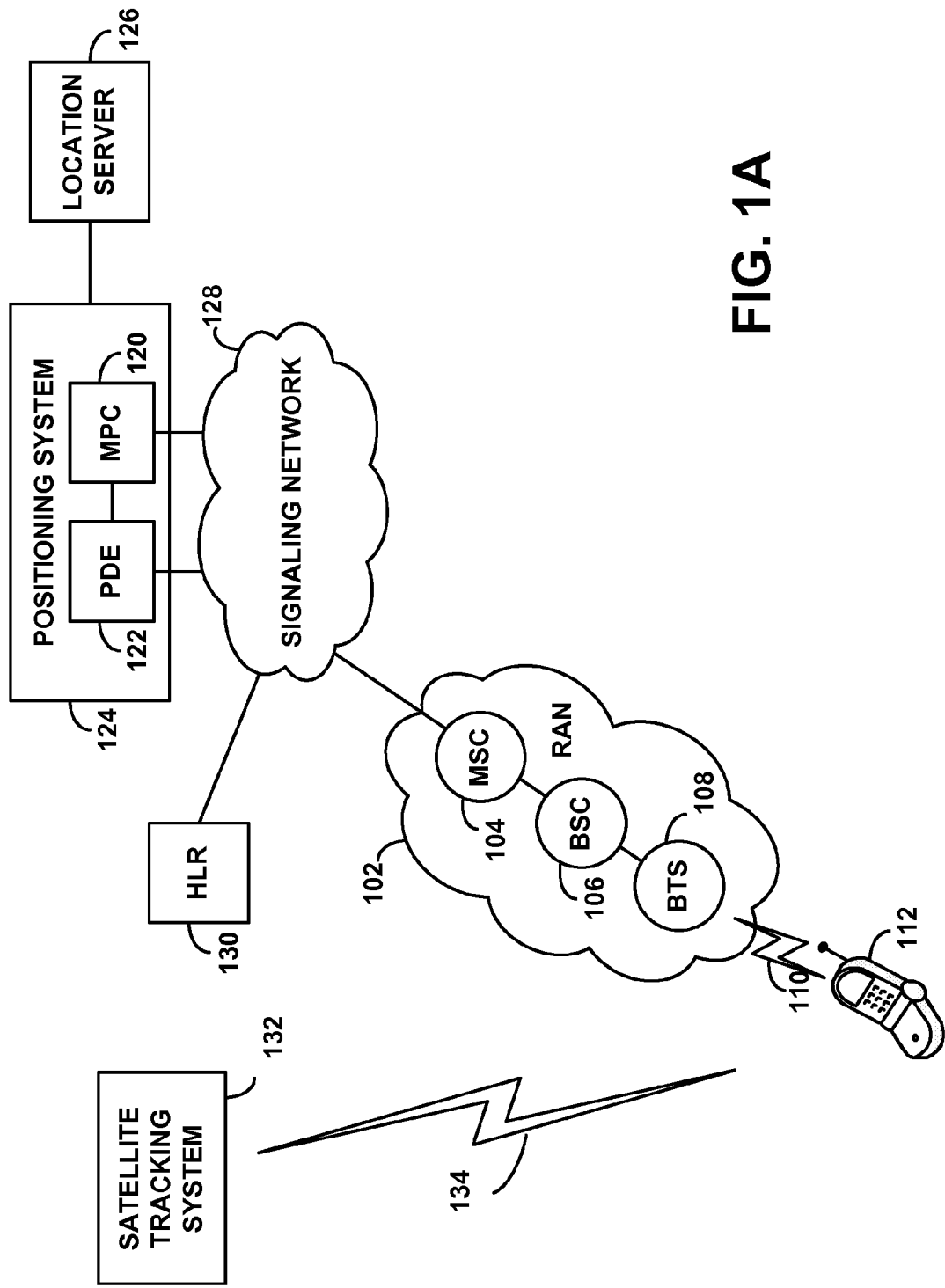
FIG. 1A is a simplified block diagram of a wireless communication system in which an exemplary wireless communication device can be employed.

Referring to the drawings, FIG. 1A is a simplified block diagram of a wireless communication system in which an exemplary wireless communication device can be employed. In such a wireless communication system, a wireless carrier typically operates a radio access network (RAN) 102, which is controlled by a switching entity such as a mobile switching center (MSC) 104. The MSC generally includes or connects with one or more base station controllers (BSCs) 106, which in turn connect with one or more base transceiver stations (BTSs) 108. Each BTS 108 conventionally includes a cell tower with one or more antennas that communicates with a wireless communication devices (WCD) 112 via an air interface 110.

Communications between the RAN 102 and WCD 112 may occur in accordance with any air interface protocol now known or later developed. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, RAN 102 may provide service in an area that is divided geographically into a number of cells, each defined by a radio frequency (RF) radiation pattern from a BTS 108. Furthermore, each cell may be subdivided into a number of sectors. For simplicity, references to a "sector" herein should be understood to include sectors, cells, and possibly other types of coverage areas as well. In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

To locate a WCD 112 operating in RAN 102, a wireless carrier may operate a positioning system 124, which may include a mobile positioning center (MPC) 120 and a position determining entity (PDE) 122. MPC 120 may be arranged to determine and report WCD locations to requesting entities. Further, MPC 120 may include or have access to PDE 122, which may operate to determine the location of a given WCD based on (i) network information and/or (ii) satellite-based positioning information. FIG. 1A depicts the MPC 120 and PDE 122 as components of a positioning system 124; in other cases, the positioning system 124 can take other forms, possibly including just one of these entities or some other entities altogether. Further, the carrier may operate a location server 126 that acts as a front end for receiving location requests from location-based service (LBS) applications and forwarding those requests to the MPC.

In a typical arrangement, communications between positioning system 124 and WCD 112 travel from the positioning system over a signaling network 128 (e.g., a Signaling System #7 (SS7) network or an IP signaling network) to the MSC 104 of the RAN. To engage in such communications, the MPC 120 may query a home location register (HLR) 130, also via the signaling network, to determine the point code subsystem number (PC_SSN) of the MSC currently serving the WCD. For instance, the MPC may send an IS-41 Location Request (LOCREQ) to the HLR, or an IS-637 SMS Request (SMSREQ) message to the HLR, providing the HLR with an identifier of the WCD, and the HLR would respond (in a Location Request return result (LOCREQ_RR) or SMS Request return result (SMSREQ_RR)) with the PC_SSN of the currently serving MSC (or a last known serving MSC). The query to the HLR could carry an identifier of the WCD (such as a mobile directory number (MDN)) as indicated in the initial location request to the MPC. The PDE can then establish communications with the WCD via the MSC currently serving the WCD.

The PDE 122 may employ various techniques to locate a WCD 112. For example, the PDE may use satellite-based tracking, trilateration or triangulation, or a combination of these techniques (e.g., Advanced GPS software such as SNAPTRACK, manufactured by Qualcomm Incorporated of San Diego, Calif., which uses trilateration to enhance GPS coordinates).

Preferably, WCD 112 may be equipped to communicate with a satellite tracking system 132 over an interface 134 and to receive location data from satellite tracking system 132. The satellite tracking system 132 is typically the Global Positioning System (GPS), although any satellite-based tracking system may be employed without departing from the scope of the invention. For example, WCD 112 may determine its location by measuring delays between the WCD and one or more GPS satellites. The delays can then be used to calculate the location of each satellite (as the signal between WCD 112 and the satellite travels at a known speed). Furthermore, each satellite may communicate its location to the WCD 112. Given the location of each satellite and the distance to each satellite, WCD 112 can perform trilateration to determine its geographic location. The wireless communication device may utilize the World Geodetic System WGS84 coordinate system, or any appropriate coordinate system, to specify its location. Alternatively, WCD 112 may send the location data received from a GPS satellite and/or other location data to the positioning system 124, which in turn may perform calculations to determine the specific location of the wireless communication device.

In a further aspect, WCD 112 may send the received location data to positioning system 124 or incorporate the received measurements in a location reporting signal to be sent to positioning system 124 or another receiving entity. Accordingly, a RAN 102 receiving a location reporting signal may be configured to work with positioning system 124 in order to determine the location of WCD 112 from the location reporting signal. Alternatively, the RAN 102 may itself determine the location of WCD 112 from the location reporting signal. For example, when the location reporting signal provides GPS coordinates, the BTS 108 and/or BSC 106 may simply extract the GPS coordinates from the reporting signal. Other examples are also possible.

In another aspect, RAN 102 and WCD 112 may be configured for Over-The-Air Service Provisioning (OTASP). OTASP allows service providers to communicate with a WCD using a wireless network, such as the Internet, in order to add new types of services to the WCD, rather than requiring that the customer to bring the WCD to a service provider location (e.g., a storefront or service center) for reprogramming. Accordingly, WCD 112 may be configured with the functionality described herein using OTASP.

Figure 1B:
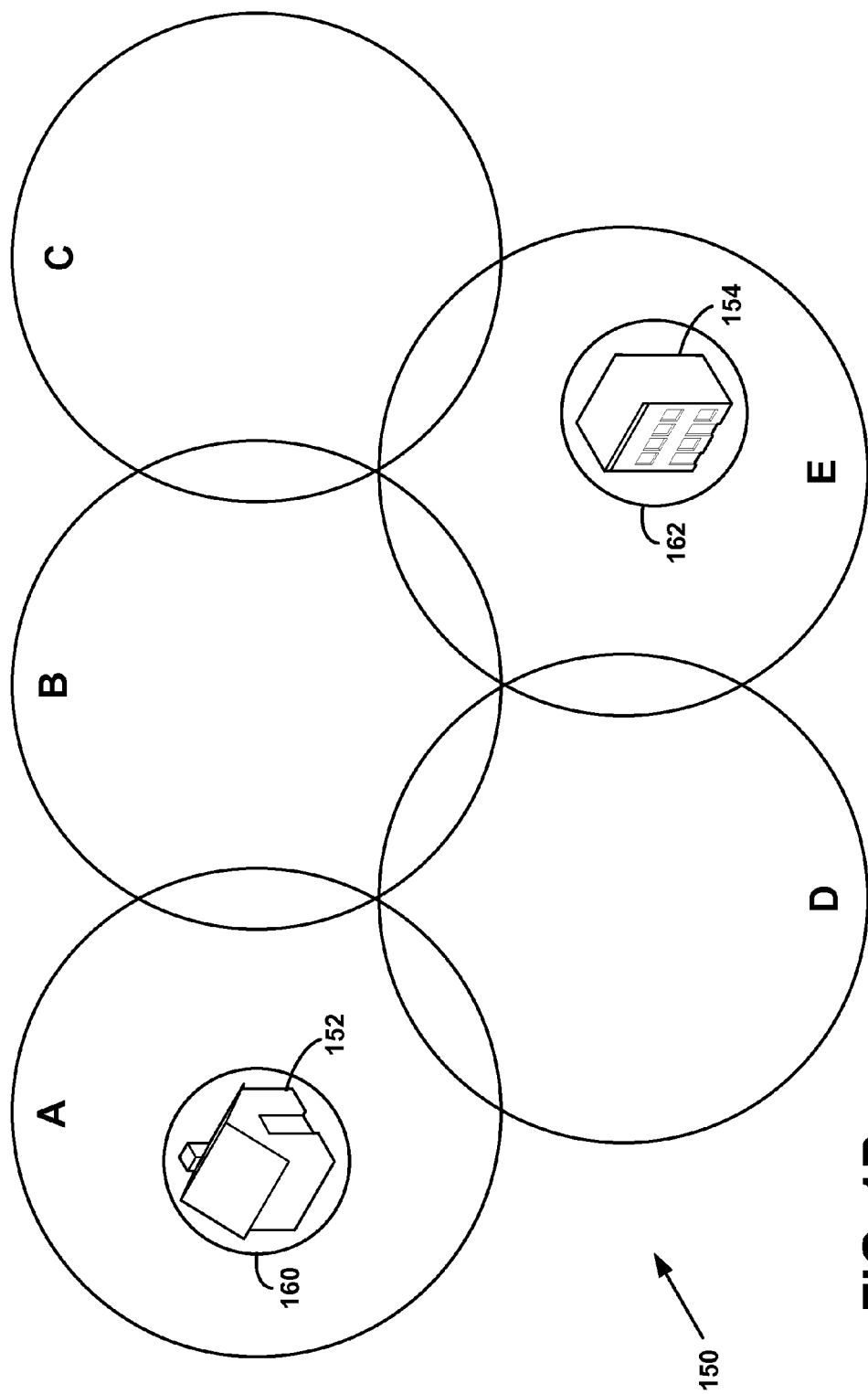
FIG. 1B is a simplified block diagram illustrating a coverage area served by a radio access network, according to an exemplary embodiment.

FIG. 1B is a simplified block diagram illustrating a coverage area 150 served by a RAN 102, according to an exemplary embodiment. The coverage area 150 includes sectors A-E, in which wireless service may be provided to a WCD 112. In addition to being configured for cellular wireless communications via a RAN, WCD 112 is configured for GPS connectivity in order to facilitate location determination. Also shown in coverage area 150 are the home 152 of the subscriber to whom WCD 112 is registered, as well as the office building 154 in which the subscriber works. Specifically, the subscriber's home 152 is located in sector A, and the subscriber's office building 154 is located in sector E.

The subscriber's home 152 and the subscriber's office building 154 create non-GPS zones 160 and 162 in sectors A and E, respectively. Non-GPS zones, which are areas where a GPS signal is not available to the WCD from a GPS satellite, often exist throughout the coverage area of a RAN. Typically, non-GPS zones exist where there is no line-of-sight between a GPS satellite and the WCD. Therefore, indoor locations, such as a subscriber's home 152 or office 154, are typically non-GPS zones. Further, it should be understood that outdoor non-GPS zones may also exist, and further, that a GPS signal may be unavailable for reasons other than the lack of a clear view of a GPS satellite.

In practice, the topology of a given sector often includes both non-GPS zones and zones where GPS is available. For instance, as illustrated in coverage area 150, non-GPS zone 160 occupies only a portion of sector A, and likewise, non-GPS zone 162 occupies only a portion of sector E. According to an exemplary embodiment, sectors A and E, where a subscriber is likely to enter a non-GPS zone and lose GPS connectivity, may be designated as GPS-priority sectors for WCD 112 (and additionally or alternatively, for the subscriber to whom WCD 112 is registered).

It should be understood that while not specifically illustrated, multiple non-GPS zones may exist within a given sector. For example, in an urban area, a sector that spans a number of city blocks may include both outdoor areas, such as parks, sidewalks, streets, parking lots, etc., where a GPS signal is available, as well as indoor or covered areas, such as office buildings and parking garages, which create non-GPS zones in the same sector.

Further, it should be understood that different subscribers may vary their typical activities, such that GPS-priority sectors may vary from subscriber-to-subscriber. For example, the subscriber registered to WCD 112 may regularly enter their office building 162 and lose GPS connectivity, and thus the sector in which their office building is located (i.e., sector E) may be considered a GPS-priority sector for the first subscriber. A second subscriber may travel through sector E on their way to work, but remain on the street and in outdoor areas where a GPS signal is available, as they travel through the sector E. Therefore, even though sector E is a GPS-priority sector for the first subscriber, the sector is not identified as a GPS-priority sector for the second subscriber.

Figure 2:
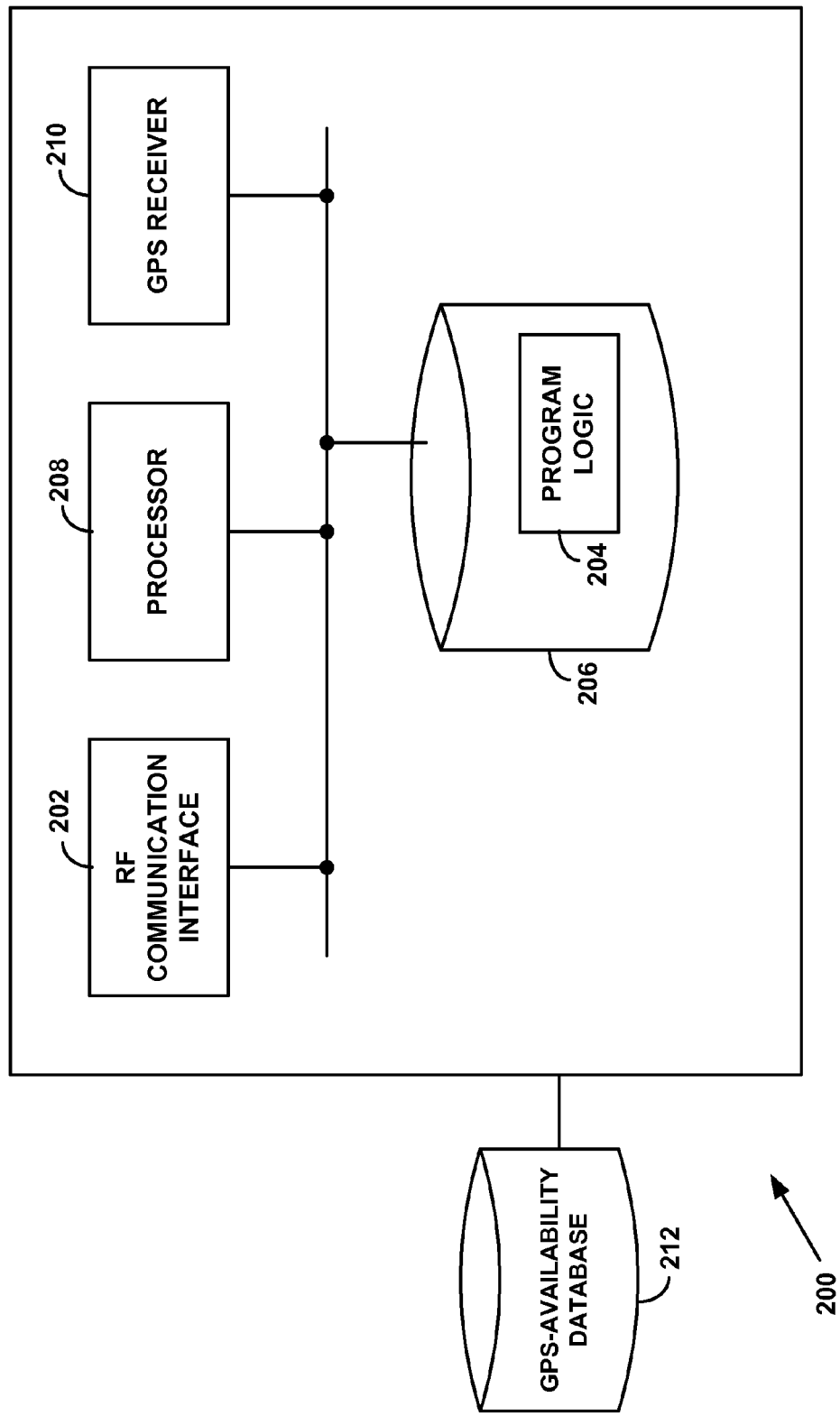
FIG. 2 depicts a representative wireless communication device, according to an exemplary embodiment.

FIG. 2 depicts a representative WCD 200 by way of example, which could be a cell phone, wirelessly equipped personal digital assistant (PDA), or any other type of wirelessly-equipped device now known or later developed. The WCD 200 is preferably equipped with hardware, software, and/or other logic to communicate with a RAN in accordance with an agreed communication protocol, such as one of the protocols noted herein for instance. For example, WCD 200 may include a radio frequency (RF) communication interface 202 that functions to facilitate air interface communications with a RAN according to one or more protocols such as those noted above.

As shown, WCD 200 may also include program logic 204 stored in data storage 206 (e.g., one or more volatile and/or non-volatile storage components of the WCD, such as magnetic, optical, or organic storage components) and executable by one or more processors 208 (e.g., general purpose and/or special purpose processors) to carry out various functions described herein. For example, WCD 200 may include program logic 204 that when executed by processor 208 can determine that the wireless communication device is likely to lose GPS connectivity, responsively power on GPS receiver 210 and receive GPS location data (e.g., GPS coordinates of the WCD), and then power off the GPS receiver 210 and store the GPS location data in data storage 206 (or in another data storage component), so that the data is available in the event that the WCD subsequently loses GPS connectivity.

Further, WCD may include or be provided access to a GPS-availability database 212, which stores GPS-availability data. The GPS-availability data may indicate, on a sector-by-sector basis, which sectors are GPS-priority sectors. Therefore, WCD 200 may access GPS-availability database 212 in order to determine when the wireless communication device is likely to lose GPS connectivity in that sector. For example, WCD 200 is preferably configured to query GPS-availability database 212 whenever WCD 200 enters a sector. Then, if the GPS-availability data indicates that the sector is a GPS-priority sector, WCD 200 powers on GPS receiver 210, receives its GPS coordinates, and stores the received GPS coordinates.

In another aspect, WCD 200 may further include user interface components (not shown) that facilitate user interaction with the WCD. The user interface components typically include interactive components such as a keypad, microphone, and/or a display screen (e.g., a VGA or TFT-LCD display, etc.), among others. Further, the user interface may conventionally include output functions such as a display screen and a loudspeaker or headset connection. Other user interfaces components are possible as well.

Provided with a user interface, the WCD may be configured to receive user input from a subscriber indicating that the subscriber is in a non-GPS zone. For example, a WCD may provide a subscriber with a feature allowing the subscriber to indicate that the subscriber is indoors, or otherwise indicate that the subscriber is in a non-GPS zone (or that the subscriber believes they are likely in a non-GPS zone). The WCD may then update the GPS-availability database to reflect the subscriber input. For example, the WCD may respond to the subscriber input by powering on to verify that the WCD is, in fact, in a non-GPS zone, and then update the GPS-availability database accordingly. Alternatively, the WCD may assume the subscriber input to be correct, and respond to the input by identifying the sector in which the WCD is currently located, and updating the GPS-availability database to indicate the subscriber entered a non-GPS zone in the sector. The WCD may use subscriber input indicating a non-GPS zone during the setup period or afterwards in order to update the GPS-availability database.

In a further aspect, the WCD may be configured to receive user input (or possibly a communication from the RAN) requesting the WCD clear the GPS-availability database and/or restart the setup period in order to rebuild the GPS-availability database. Such a feature may be particularly useful when a subscriber changes their typical geographic usage pattern, such as when a subscriber moves to a new city, or starts a new job for instance.

Figure 3:
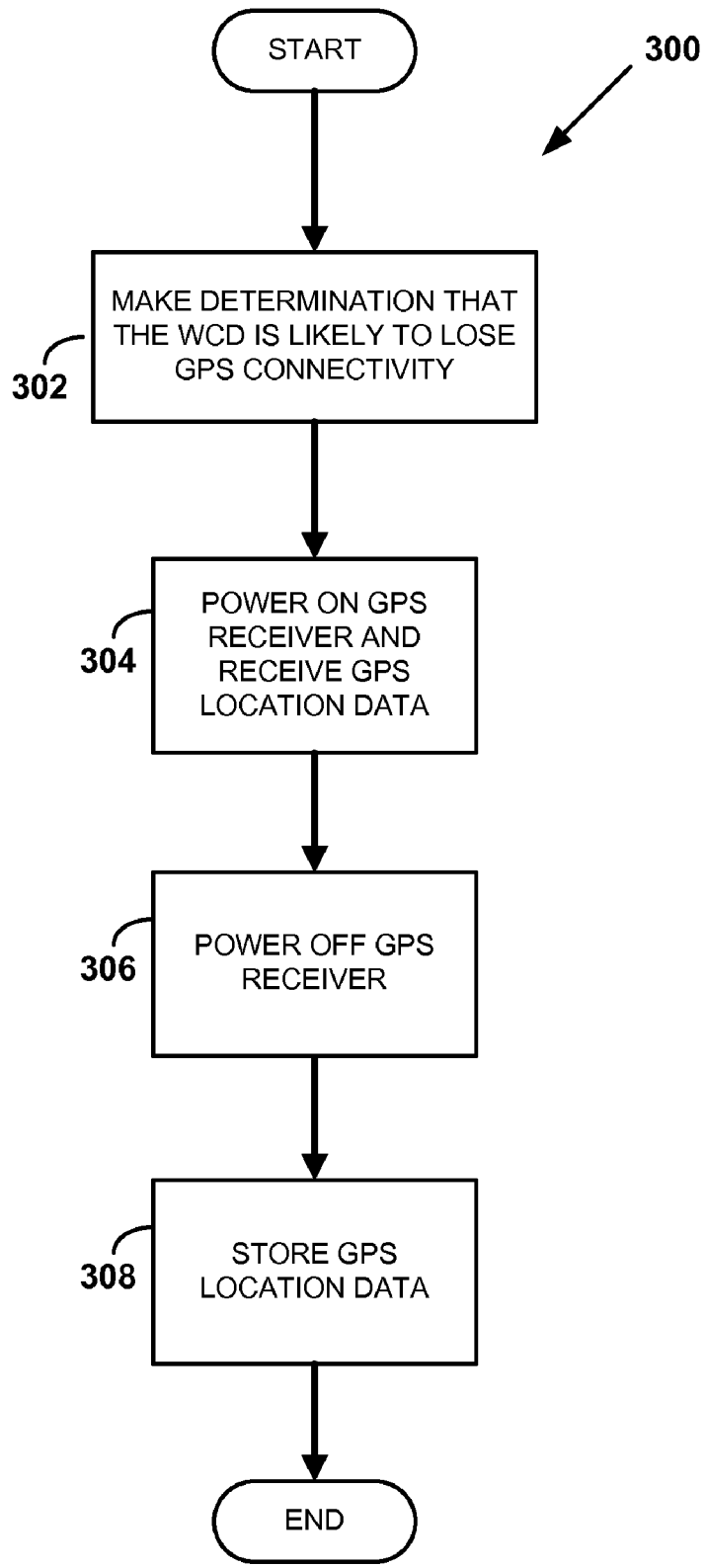
FIG. 3 is a flow chart illustrating a method, according to an exemplary embodiment.

FIG. 3 is a flow chart illustrating a method 300 according to an exemplary embodiment. The method 300 is preferably carried out by a WCD or a system within a WCD. Alternatively, the method, or portions thereof, may be carried out by other entities in communication with the WCD. As shown, the method involves the WCD making a determination that it is likely to lose GPS connectivity, as shown by block 302. In response, the WCD powers on its GPS receiver and receives GPS location data (e.g., GPS coordinates) indicating its current location, as shown by block 304. The WCD then powers off, as shown by block 306 and stores the GPS location data, as shown by block 308. It should be understood that while the WCD is shown as powering off and then storing GPS location data, it is within the scope of the invention that the order of these steps be reversed.

The step of the WCD determining that it is likely to lose GPS connectivity, as shown in block 302, may take various forms. In an exemplary embodiment, the WCD may access GPS-availability data identifying certain sectors as GPS-priority sectors, where the WCD is likely to enter a non-GPS zone. For example, sector may be designated as a GPS-priority sector if it is a sector in which the WCD has previously entered a non-GPS zone and lost GPS connectivity. As another example, a WCD may designate a sector as a GPS-priority sector when it has received manual user input (e.g., button press) from a subscriber that indicates a particular location is an indoor location (e.g. home, office, etc.) or other location where the WCD is likely to lose GPS connectivity. And as another example, the WCD may automatically designate sectors including certain locations as GPS-priority sectors for the WCD. Such locations may include the home or billing address of the subscriber to which the WCD is registered, as well as other indoor locations that attract a large number of subscribers (e.g., shopping malls, stadiums, or arenas).

When the WCD enters a GPS-priority sector, the WCD powers on its GPS receiver and attempts to obtain and store its GPS coordinates before GPS connectivity is lost, as illustrated by blocks 304-308. The WCD may power on the GPS receiver for only a short period or until it obtains GPS coordinates, and then power off the receiver, in effort to further reduce power consumption by the GPS receiver. Alternatively, when the WCD enters a GPS-priority sector, the WCD may keep the GPS receiver powered on until GPS connectivity is lost (or until the WCD leaves the sector). While doing so may use more power, this helps the WCD store the last-received GPS coordinates before GPS connectivity was lost, and storing the last-received GPS coordinates may provide a more accurate indication of location in the event the WCD needs to be located while in the non-GPS zone.

In a further aspect, the WCD may transmit a reporting message to the RAN, which includes the stored GPS location data. For instance, the WCD may transmit its location to the RAN when the WCD places an emergency call, such as a 9-1-1 call, for instance. Techniques for placing such a call and providing location data to a RAN are disclosed in co-owned U.S. patent application Ser. No. 11/937,292, which is incorporated by reference in its entirety.

In yet a further aspect, while in a non-GPS zone, the WCD may supplement or update the stored GPS location data with additional location data obtained using other techniques. For example, wireless service from the RAN (under CDMA, for instance) is typically still available in a non-GPS zone. Accordingly, the WCD may generate supplemental location data using a trilateration-based technique. As another example, a WCD equipped with an accelerometer and compass may generate supplemental location data by tracking its movement from the stored GPS coordinates. Techniques for use of an accelerometer and compass to track location after a GPS signal is lost are also disclosed in co-owned U.S. patent application Ser. No. 11/937,292. Other techniques for generating supplemental location data and/or updating the location of the WCD are also possible.

Figure 4:
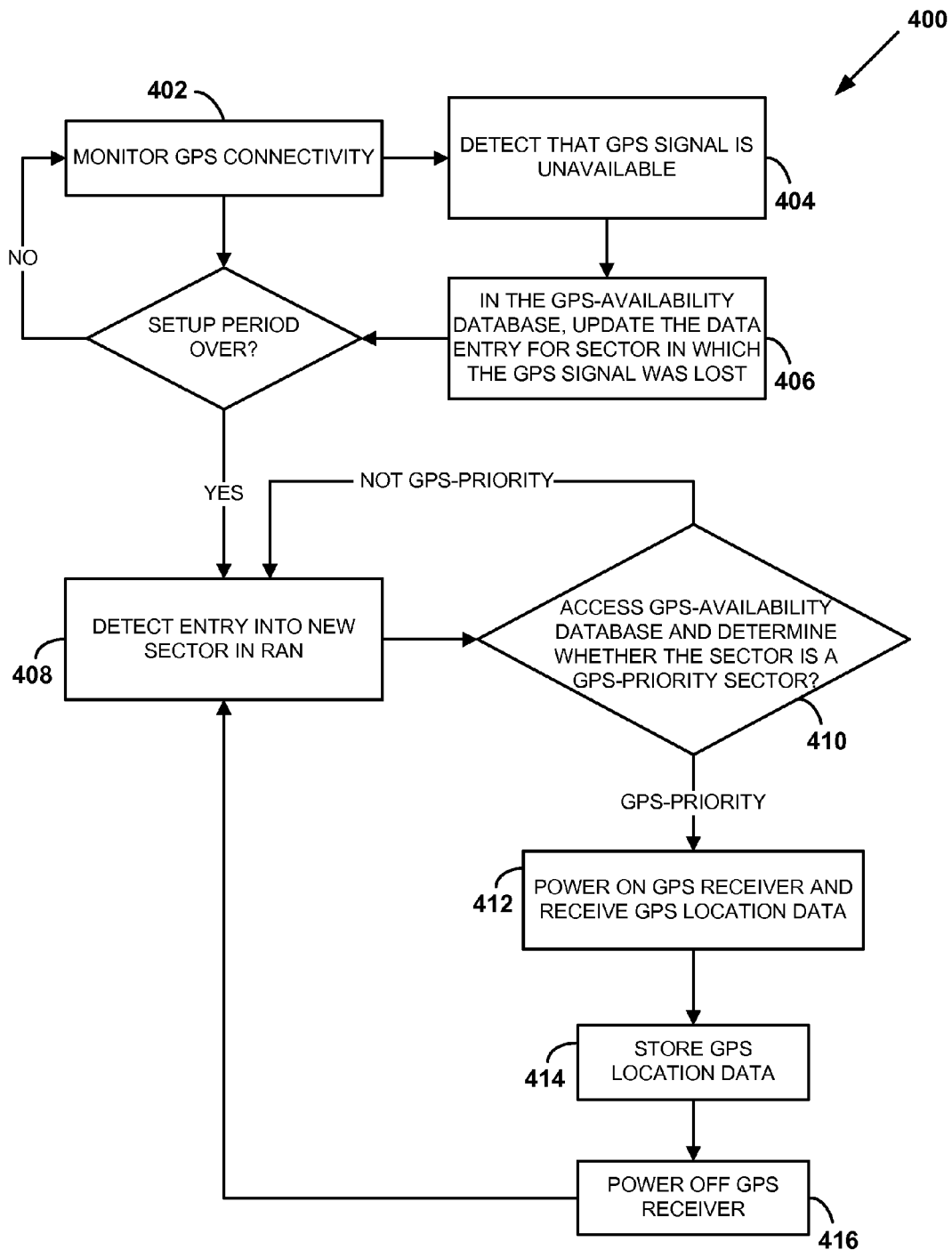
FIG. 4 is another flow chart illustrating a method, according to an exemplary embodiment.

FIG. 4 is another flow chart illustrating a method 400 according to an exemplary embodiment. To facilitate the WCD determining when it is likely to lose GPS connectivity, method 400 involves the WCD creating a GPS-availability database that indicates GPS-priority sectors for the WCD. In particular, method 400 involves the WCD monitoring GPS connectivity during a setup period of a predetermined duration, as shown by block 402. During this setup period, the WCD detects when GPS connectivity is unavailable; i.e., that the WCD has entered a non-GPS zone and lost its GPS signal, as shown by block 404. The WCD then updates the GPS-availability database to reflect that GPS connectivity was unavailable in this instance, and in an exemplary embodiment, updates a data entry for the sector in which the GPS signal was lost, as shown by block 406. Optionally, the WCD may also update the GPS-availability database in instances when a GPS signal is available. By monitoring GPS connectivity and updating the GPS-availability database during the setup period, the WCD builds a GPS-availability database that indicates which sectors are GPS-priority sectors for the WCD.

The WCD may use various parameters to identify specific sectors in the GPS-availability database. Preferably, the WCD uses a system-ID (SID), a network-ID (NID), and/or a base station ID (BID) to identify each sector in the GPS-availability database. These parameters, which may be used to identify a cell sector, are typically broadcast by a base station via the control channel, and stored by the WCD upon receipt. Additionally or alternatively, a base station might broadcast its GPS coordinates over the control channel, and a WCD could then use the GPS coordinates to identify its current sector. Further, other techniques for identifying sectors may also be employed, without departing from the scope of the invention.

After populating the GPS-availability database, the WCD may detect whenever it enters a new sector in the RAN, as shown by block 408. When the WCD enters a sector, the WCD may then access the GPS-availability database to determine whether the sector is a GPS-priority sector, as shown by block 410. If the sector is a GPS-priority sector, then WCD powers on its GPS receiver and receives GPS location data indicating its current location, as shown by block 412. The WCD then powers off the GPS receiver, as shown by block 414, and stores the GPS location data, as shown by block 416.

During the setup period, to detect when GPS connectivity is unavailable and build the GPS-availability database, the WCD may periodically power on its GPS receiver to search for a GPS signal. When a GPS signal is obtained or, alternatively, after a predetermined period without obtaining GPS connectivity, the WCD powers off the GPS receiver and updates the GPS-availability database. By doing so periodically during the setup period, the WCD can build a GPS-availability database with data indicating each instance when GPS connectivity was unavailable and/or indicating the sector in which the WCD was located each time the GPS connectivity was unavailable. Thus, the GPS-availability database may provide historical data indicating the sectors in which the WCD entered a non-GPS zone during the setup period and/or how many times or how often the WCD entered a non-GPS zone in a given sector.

The GPS-availability data gathered during the setup period may then be used to create a data entry for each sector through which the WCD travels, indicating whether or not the sector is a GPS-priority sector. In particular, a non-GPS level may be calculated for each sector that indicates how often or how many times GPS connectivity was unavailable during the setup period. Accordingly, a non-GPS level above a predetermined threshold may indicate that a corresponding sector is a GPS-priority sector, in which the WCD is likely to lose GPS connectivity.

In an alternative embodiment, the WCD may designate any sector in which GPS connectivity is lost during the setup period, as a GPS-priority sector. In particular, whenever the WCD enters a sector, the WCD may check whether an entry exists in the GPS-availability database for the sector. If no entry exists, the WCD will power its receiver on while it is located in the sector. Then, if GPS connectivity is lost it will create an entry designating the sector as a GPS priority sector. On the other hand, if GPS connectivity is not lost, no entry is created. As such, once GPS connectivity is lost in a sector, in a single instance, the sector is designated as a GPS-priority sector, and upon re-entry during the setup period, the GPS receiver will not be powered on, since the database entry for the sector will already exist.

Other variations on the technique used to build the GPS-availability database may exist. For example, during the setup period, the WCD may automatically turn its GPS receiver on, and leave the receiver on, rather than periodically powering on and off the GPS receiver. Furthermore, while the WCD preferably stops gathering GPS-availability data after the setup period (as powering on the GPS receiver to do so drains the WCD power supply, reducing battery-life), it is possible that the WCD may from time-to-time update its GPS-availability database, after the setup period. Other variations are also possible.

In a further aspect, the WCD may use location information obtained from a subscriber to generate GPS-availability data. For instance, the WCD may prompt a subscriber, via a user interface, to enter addresses where the subscriber is typically indoors, such as the subscriber's home address or office address. The WCD may then determine the sector in which the address or addresses or located, and designate such sectors as GPS-priority sectors. In particular, the WCD may query a RAN to obtain sector IDs corresponding to a given address, and then create a data entry in its GPS-availability database including the sector IDs and an indication that the sector is a GPS-priority sector. Alternatively, the RAN may simply provide the sector IDs for certain addresses, such as a subscriber's home address, automatically.

Exemplary methods, such as method 400 may generally be used to create GPS-availability data that is individualized for a particular WCD. Specifically, since GPS-priority sectors may be identified based on where the particular WCD loses its GPS signal, the GPS-priority sectors identified may vary from WCD to WCD. However, it is contemplated that in some scenarios, it may be desirable to coordinate and share GPS-availability data between WCDs. For example, a subscriber who owns multiple WCDs may wish to coordinate GPS-availability data between their WCDs. As another example, a group of subscribers that frequent a common location, such as a family or group of co-workers, may wish to share at least some of their GPS-availability data. Other examples are also possible.

To share the GPS-availability data between WCDs, an exemplary method may further involve a WCD sharing data stored in its GPS-availability database with one or more other WCDs. To do so, the WCD may communicate with the other WCDs via a RAN, an Internet connection, or directly using a protocol such as Bluetooth. More generally, the WCD may employ any wired or wireless communication protocol, which may be selected as a matter of engineering design choice.

When a subscriber wishes to share GPS-availability data between multiple WCDs registered to the subscriber, or a group wishes to share GPS-availability data between WCDs of group members, GPS-availability databases may be generated on a subscriber-by-subscriber or group-by-group basis, respectively. Therefore, in an alternative embodiment, a RAN entity maintains a common GPS-availability database for the subscriber or group. Accordingly, during the setup period the WCDs sharing the GPS-availability database may transmit data to populate the GPS-availability database to the RAN, rather than storing such data locally. Then at the end of the setup period, the RAN may transmit data from the GPS-availability database, which is the product of data reported by all WCDs sharing the database, to each WCD, so that the WCDs may store the GPS-availability data locally. Alternatively, each WCD may transmit a GPS-priority request to the RAN whenever entering a sector, in order to determine if the sector is a GPS-priority sector in which the WCD is likely to lose GPS connectivity. And as another alternative, the RAN may automatically send a GPS-priority indication to the WCD, whenever the WCD enters a new sector (such as when the WCD registers in a new sector).

Figure 5:
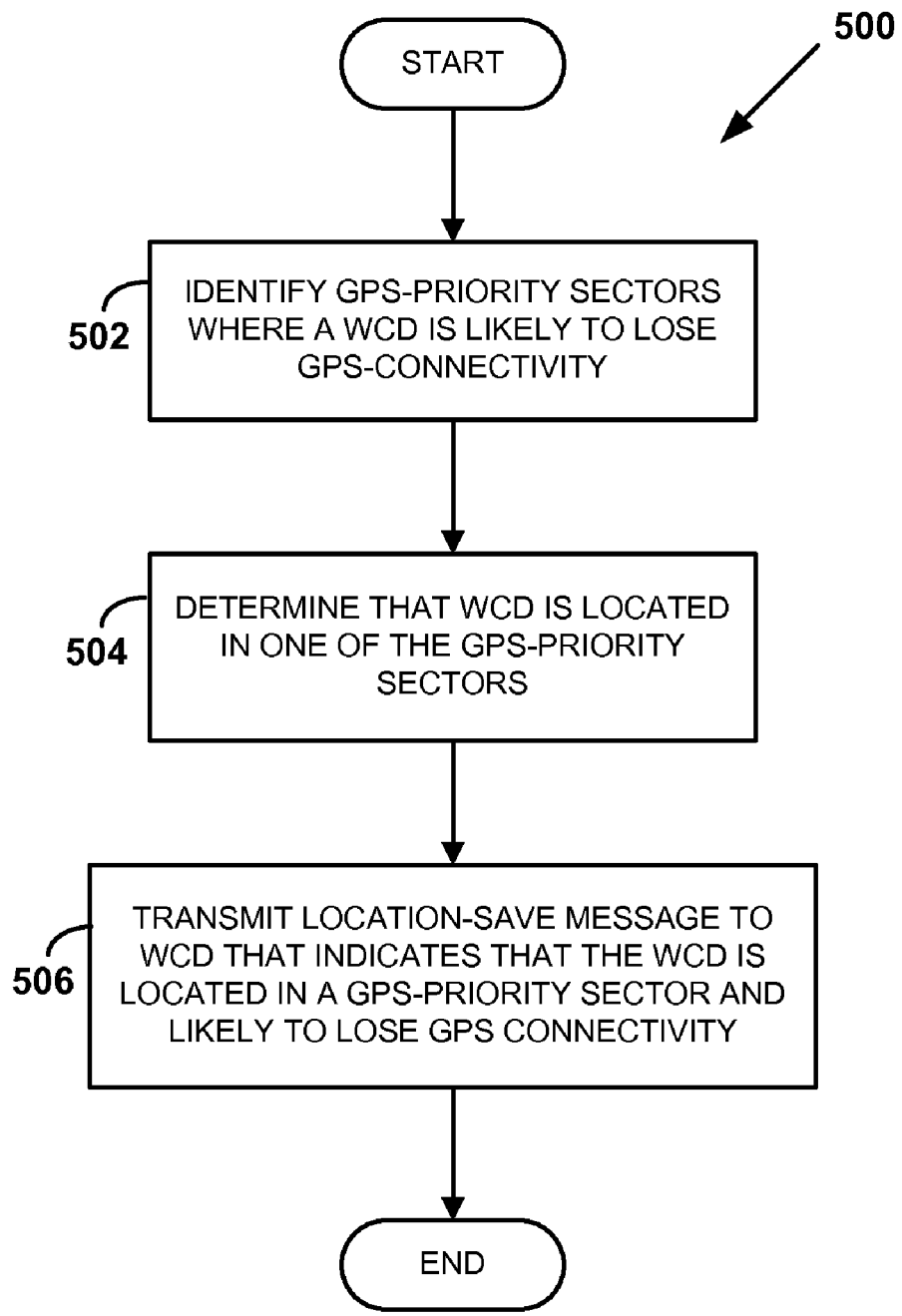
FIG. 5 is another flow chart illustrating a method, according to an exemplary alternative embodiment.

FIG. 5 is a flow chart illustrating a method 500, according to an exemplary alternative embodiment, in which the RAN detects when a WCD is likely to lose GPS connectivity. The method is preferably carried out by a BTS and/or RNC in the RAN. The method involves the RAN initially identifying one or more GPS-priority sectors where a wireless communication device is likely to lose GPS connectivity, as shown by block 502. The RAN then determines that the wireless communication device is located in one of the GPS-priority sectors, as shown by block 504. In response, the RAN then transmits a GPS-priority message to the wireless communication device, which indicates that the wireless communication device is located in one of the GPS-priority sectors, as shown by block 506. By doing so, the RAN causes the wireless communication device to power on its GPS receiver to receive GPS location data for the wireless communication device, store the received GPS location data, and then power off its GPS receiver.

In a further aspect, the step of identifying the GPS-priority sectors for the WCD may involve the RAN initially receiving GPS-availability data from the WCD, which identifies, or can be used by the RAN to identify, the GPS-priority sectors for the WCD. The RAN may then store the received data in a GPS-availability database, which the RAN may reference whenever the WCD enters a sector, in order to determine if the newly-entered sector is a GPS-priority sector for the WCD.

Additionally or alternatively, the step of identifying the GPS-priority sectors for the WCD may involve identifying one or more non-GPS zones associated with the subscriber, and then determining the sector in which each of the non-GPS zones is located. Such non-GPS zones may be identified using the billing address of the subscriber, the home address of the subscriber, and/or work address of the subscriber to whom the WCD is registered. Other locations may also be identified as non-GPS zones for the WCD. The sectors in which these non-GPS zones are located may then be designated as GPS-priority sectors for the WCD.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   (a) at a wireless communication device operating in a radio access network, making a determination that the wireless communication device is likely to lose global positioning system (GPS) connectivity, wherein making the determination that the wireless communication device is likely to lose GPS connectivity comprises determining that a sector in which the WCD is located is a GPS-priority sector for the WCD;
   (b) in response to the determination, powering on a GPS receiver to receive GPS location data for the wireless communication device; and
   (c) powering off the GPS receiver and storing the received GPS location data.

2. The method of claim 1, wherein making the determination that the wireless communication device is likely to lose GPS connectivity comprises receiving a user input indicating that the user is about to enter a non-GPS zone.

3. The method of claim 1, wherein the step of determining that the sector in which the WCD is located is a GPS-priority sector for the WCD is performed in response to the WCD entering the sector.

4. The method of claim 1, further comprising the WCD initially:
   generating GPS-availability data identifying GPS-priority sectors for the WCD; and
   at least one of (a) storing the GPS-availability data in data storage at the WCD and (b) transmitting the GPS-availability data to the RAN to be stored in data storage at the RAN;
   wherein making the determination that the wireless communication device is likely to lose GPS connectivity comprises determining that the WCD is operating in a GPS-priority sector.

5. The method of claim 4, wherein generating the GPS-availability data identifying GPS-priority sectors for the WCD comprises, during a setup period of a predetermined duration, periodically:
   powering on the GPS receiver and making a determination as to whether or not a GPS signal is available to the WCD;
   if a GPS signal not available, then:
      (i) identifying which sector of the RAN the WCD is operating in; and
      (ii) generating GPS-availability data indicating that the sector is a GPS-priority sector for the WCD.

6. The method of claim 4, wherein generating the GPS-availability data identifying GPS-priority sectors for the WCD comprises, during a setup period of a predetermined duration:
   monitoring GPS connectivity for the WCD; and
   detecting when GPS connectivity is unavailable to the WCD and identifying one or more sectors in which the WCD is located when GPS connectivity is unavailable.

7. The method of claim 6, wherein generating the GPS-availability data identifying GPS-priority sectors for the WCD further comprises creating a data entry for each sector where GPS connectivity was indicated to be unavailable, wherein the data entry indicates the sector is a GPS-priority sector.

8. The method of claim 6, wherein generating the GPS-availability data identifying GPS-priority sectors for the WCD further comprises:
determining, for each of the sectors, a corresponding non-GPS level indicating how often or how many times GPS connectivity was unavailable during the setup period;
wherein the non-GPS level is above a predetermined threshold then generating a data entry indicating that the corresponding sector is a GPS-priority sector.

9. The method of claim 1, wherein making the determination that the wireless communication device is likely to lose GPS connectivity comprises:
identifying which sector of the RAN the WCD is operating in; and
accessing a GPS-availability database to determine whether or not the sector in which the RAN is operating is a GPS-priority sector, wherein operating in the GPS-priority sector indicates that the wireless communication device is likely to lose GPS connectivity.

10. The method of claim 1, wherein the wireless communication device, by default, operates with the GPS receiver powered off, when not performing the method of claim 1.

11. The method of claim 1, wherein the wireless communication device enters a non-GPS zone and loses GPS connectivity, the method further comprising:
while the wireless communication device is located in the non-GPS zone without GPS connectivity, transmitting the stored GPS location data to a radio access network.

12. The method of claim 1, the method further comprising, after powering off the GPS receiver, using at least one of (a) a compass and an accelerometer and (b) trilateration data based on signals from a plurality of nearby base stations to track location of the wireless communication device from the stored GPS location data.

13. The method of claim 1, wherein the WCD performs (a)-(c) in order to store the last-available GPS coordinates before entering a non-GPS zone.

14. A method comprising:
at a radio access network configured to provide wireless service to a wireless communication device in a plurality of sectors, identifying one or more GPS-priority sectors where the wireless communication device is likely to lose GPS connectivity;
making a determination that the wireless communication device is located in one of the GPS-priority sectors; and
in response to the determination, transmitting a message to the wireless communication device that indicates that the wireless communication device is located in one of the GPS-priority sectors, thereby causing the to the wireless communication device to power on a GPS receiver to receive GPS location data for the wireless communication device, store the received GPS location data, and then power off the GPS receiver.

15. The method of claim 14, wherein identifying one or more GPS-priority sectors where the wireless communication device is likely to lose GPS connectivity comprises receiving GPS-availability data from a wireless communication device, wherein the GPS-availability data indicates one or more GPS-priority sectors.

16. The method of claim 14, wherein identifying one or more GPS-priority sectors where the wireless communication device is likely to lose GPS connectivity comprises:
identifying one or more non-GPS zones associated with the subscriber; and
determining the sector in which each of the non-GPS zones is located.

17. The method of claim 16, wherein the one or more non-GPS zones associated with the subscriber comprise at least one of (a) a billing address of the subscriber, (b) a home address of the subscriber, and (c) a work address of the subscriber.

18. The method of claim 14, wherein identifying one or more GPS-priority sectors where the wireless communication device is likely to lose GPS connectivity comprises identifying one or more general GPS-priority sectors.

19. A system comprising:
at least one processor;
data storage; and
program logic stored in the data storage and executable by the at least one processor to:
(a) maintain a GPS-availability database indicating GPS-priority sectors for a wireless communication device;
(b) determine that the wireless communication device is likely to lose global positioning system (GPS) connectivity;
(c) in response to a determination that the wireless communication device is likely to lose GPS connectivity, power on a GPS receiver to receive GPS location data for the wireless communication device;
(d) store the received GPS location data in the data storage; and
(e) power off the GPS receiver.

* * * * *